Patented Dec. 10, 1929

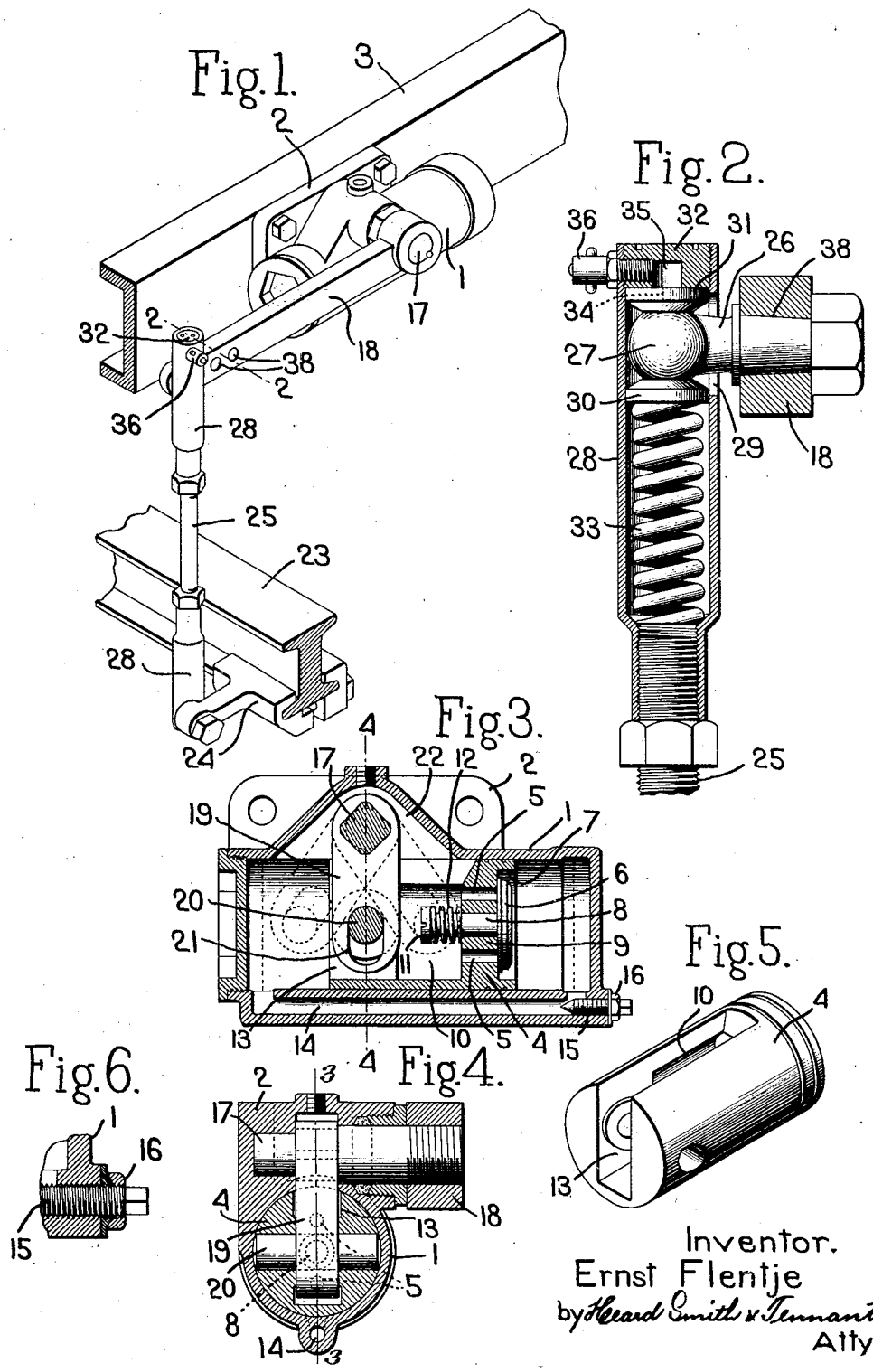

1,739,132

UNITED STATES PATENT OFFICE

ERNST FLENTJE, OF CAMBRIDGE, MASSACHUSETTS

SHOCK ABSORBER

Application filed November 19, 1927. Serial No. 234,402.

This invention relates to shock absorbers for automobiles and has for its object to provide a novel shock absorber which is relatively simple and inexpensive to manufacture, but which is effective in operation.

The novel features of the invention will be pointed out in the following description of a selected embodiment of the invention.

In the drawings, Fig. 1 is a fragmentary perspective view illustrating my improved shock absorber applied to an automobile;

Fig. 2 is an enlarged sectional view on the line 2—2, Fig. 1;

Fig. 3 is a section on the line 3—3, Fig. 4;

Fig. 4 is a section on the line 4—4, Fig. 3;

Fig. 5 is a perspective view of the piston;

Fig. 6 is a sectional view illustrating the packing for the valve.

My improved shock absorber is of the type comprising a cylinder adapted to contain liquid and arranged to be attached to the frame of an automobile, and a valved piston in the cylinder which is connected to the axle of the automobile and which is arranged so that it will move more freely in one direction than in the other direction.

The cylinder member is designated generally at 1 and it is formed with the flange portion 2 by which it is bolted to the frame 3 of an automobile.

The piston member which operates in the cylinder is indicated generally at 4. Said member is formed with ports 5 extending therethrough and is provided with a valve 6 which is arranged to close the ports as the piston moves to the right, and to open the ports as the piston moves to the left. The piston is recessed at one end as shown at 7 to receive the valve 6, the latter having a valve stem 8 which extends through the portion 9 of the piston into a chamber 10 with which the piston is provided, said chamber communicating with the slot 13 that opens at the side and end of the piston.

The valve stem is provided with the head 11 which forms a backing for a spring 12 that surrounds the valve stem and that yieldingly holds the valve to its seat thereby closing the ports 5. This spring, however, allows the valve to be unseated thereby to open the ports 5 as the piston moves to the left.

The cylinder member 1 is provided with a by-pass 14 connecting the ends of the cylinder around the piston, said by-pass being controlled by a valve 15 which has a screw-threaded stem and screws into the end of the cylinder member, said valve being locked in its adjusted position by a locking nut 16. By adjusting the valve 15 the by-pass can be restricted more or less depending upon the character of the liquid used in the cylinder and also upon the degree of retarding movement which it is desired to give to the piston.

The cylinder member 1 has a rock shaft 17 journalled therein which is connected to the piston 4 and is provided with an arm 18 that is connected to the automobile axle. The connection between the piston 4 and the rock shaft is constituted by an arm 19 which is fast on the rock shaft and which extends into the slot 13 of the piston, said arm being pivotally connected to the piston by a pin 20 which extends transversely through the piston. The arm 19 is formed with a slot 21 through which the pin 20 extends, the purpose of the slot being to prevent binding of the parts as the rock shaft is operated. The cylinder member is shaped to form the chamber 22 in which the arm 19 is received and which communicates with the cylindrical portion of the cylinder in which the piston operates.

The arm 18 may be connected to the axle 23 of the automobile in various ways. As herein shown the axle has a bracket arm 24 clamped thereto which is pivotally connected to the lower end of a link 25, the latter in turn being pivotally connected to the arm 18. The arm 18 has a stud 26 secured thereto, the end of which is provided with a ball 27. The upper end of the connection 25 is provided with a tubular portion 28 having a lateral opening 29 through which the arm 26 extends.

The ball 27 is confined between two seat members 30 and 31 that are situated within the tubular extension 28, the seat member 31 being backed by a plug 32 screw threaded into the end of the tubular member and the seat member 30 being backed by a relatively heavy spring 33. This provides a sort of universal joint connection between the arm 18 and connection 25.

To keep the joint lubricated the seat member 31 is provided with an opening 34 leading to a chamber 35 in the plug 32. A connection 36 at the side of the tubular member provides means for forcing grease into the bearing. A similar pivotal connection will be employed between the bracket arm 24 and the lower end of the connection 25.

The arm 18 will preferably be provided with a plurality of openings 38 into any one of which the stud 26 may be placed depending upon the amount of relative movement between the automobile body and the axle which the springs permit.

The operation of the device will be readily understood. It will be installed on the automobiles so that when the springs are in normal condition the piston will be about midway of the cylinder. As the springs are compressed by the wheel running over a hummock or otherwise, the relative movement of the body towards the axle will rock the shaft 17 in a direction to cause the piston to move to the left, during which movement the valve 6 will open to allow the liquid to flow through the ports 5. The piston, therefore, will have a relatively free movement to the left because the liquid at the left of the piston can be transferred to the right of the piston through both the ports 5 and through the by-pass 14. As the spring recoils the piston will be moved to the right and during such movement the valve 6 will be closed so that the piston can travel only as fast as the liquid is permitted to flow through the restricted by-pass 14. By adjusting the valve 15 this shock-absorbing movement of the piston can be varied to suit the requirements of use.

It will be noted that in this shock absorber the cylinder is arranged horizontally so that the piston travels longitudinally of the automobile frame. This is an advantage as it requires less space for the installation of the shock absorber than if the cylinder extended vertically, and is also beneficial as it distributes the shock-absorbing strain longitudinally of the frame.

In order to make a tight joint at the valve 15 I have made the lock nut 16 with a recess 37 and I employ a lead washer 38 between the nut and the cylinder. When the nut is tightened the lead will be forced into the recess 37 and crowded firmly against the threads of the valve thus making a perfectly tight joint.

I claim:

In a shock obsorber, the combination with a cylinder member, of a plunger therein, said plunger having a slot extending from one end nearly to the other end and extending from one side nearly to the other side, the unslotted end of the piston being provided with a port which leads from the end face of the piston into the slot, a spring-pressed valve for closing said port, said cylinder having a by-pass extending from one end thereof to the other around the piston, a valve adjustable from the end of the cylinder for controlling the by-pass, a rock shaft journalled in the cylinder member and situated outside of the plunger, a slotted arm fast on the rock shaft extending into the slot of the plunger, a pin carried by the plunger and extending through the slot of said arm, a second arm on the rock shaft outside the cylinder member, means for connecting said cylinder member to the frame of the automobile, and means for connecting said second arm to the axle of the automobile.

In testimony whereof, I have signed my name to this specification.

ERNST FLENTJE.